(12) United States Patent
Maeda et al.

(10) Patent No.: US 6,770,397 B1
(45) Date of Patent: Aug. 3, 2004

(54) BINDER COMPOSITION FOR LITHIUM ION SECONDARY BATTERY ELECTRODES AND USE THEREOF

(75) Inventors: Kouichirou Maeda, Tokyo (JP); Masahiro Yamakawa, Kawasaki (JP); Katsuya Nakamura, Kawasaki (JP); Fumio Takano, Kawasaki (JP)

(73) Assignee: Zeon Corporation, Tokyo (JP)

(*) Notice: Subject to any disclaimer, the term of this patent is extended or adjusted under 35 U.S.C. 154(b) by 206 days.

(21) Appl. No.: 10/030,086

(22) PCT Filed: Jul. 14, 2000

(86) PCT No.: PCT/JP00/04752
§ 371 (c)(1),
(2), (4) Date: Jan. 14, 2002

(87) PCT Pub. No.: WO01/06584
PCT Pub. Date: Jan. 25, 2001

(30) Foreign Application Priority Data

Jul. 15, 1999 (JP) .............................. 11-202296

(51) Int. Cl.$^7$ ................................ H01M 4/62
(52) U.S. Cl. ................. 429/217; 429/231.95; 526/319; 252/182.1
(58) Field of Search ................... 429/217, 209, 429/213, 214, 215, 216; 249/231.95; 526/319; 252/182.1

(56) References Cited

U.S. PATENT DOCUMENTS

| 5,519,087 | A | 5/1996 | Tang |
| 5,565,284 | A | 10/1996 | Koga et al. |
| 5,584,893 | A | 12/1996 | Mitchell |
| 5,595,841 | A | 1/1997 | Suzuki |
| 5,856,042 | A | 1/1999 | Bailey |
| 6,287,723 | B1 * | 9/2001 | Maeda et al. ............... 429/206 |

FOREIGN PATENT DOCUMENTS

WO   WO99/27599   6/1999

OTHER PUBLICATIONS

Abstract of JP 01169873; Jul. 5, 1989.
Abstract of JP 01169875; Jul. 5, 1989.
Abstract of JP 09328695; Dec. 22, 1997.
Abstract of JP 07101778; Apr. 18, 1995.
Abstract of JP 09–199130; Jul. 31, 1997; Ohashi Kazuyoshi et al.

* cited by examiner

*Primary Examiner*—Robert D. Harlan
(74) *Attorney, Agent, or Firm*—Armstrong, Kratz, Quintos, Hanson & Brooks, LLP

(57) ABSTRACT

A binder composition comprising a polymer dispersed in a liquid dispersion medium, wherein the polymer comprises structural units represented by the following formula:

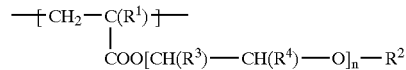

wherein $R^1$ is hydrogen, C1–4 alkyl group, or halogen, $R^2$ is C1–20 alkyl group or C6–30 aryl group, $R^3$ and $R^4$ are hydrogen or methyl group, provided that $R^3$ and $R^4$ are not simultaneously methyl group, and n is an integer of 1–50. A lithium ion secondary battery having an electrode made by using this binder composition exibibits excellent characteristics at repetition of a charge-discharge cycle.

11 Claims, No Drawings

BINDER COMPOSITION FOR LITHIUM ION SECONDARY BATTERY ELECTRODES AND USE THEREOF

TECHNICAL FIELD

This invention relates to a binder composition used for an electrode for a lithium ion secondary battery, a slurry of the binder composition, an electrode made from the slurry, and a lithium ion secondary battery fabricated by using the electrode.

BACKGROUND ART

In recent years, portable electronic appliances such as a notebook-sized personal computer, a portable telephone and a personal digital assistant have spread wide. Among secondary batteries used as a power source of the portable electronic appliances, lithium ion secondary batteries (hereinafter referred to as "batteries" when appropriate) are widely used. Portable appliances have been rapidly rendered small in size, thin in thickness, light in weight and high in performance in order to enhance the comfortableness as portable appliances. Thus portable appliances are utilized in many fields. With the broadening of use thereof, requirements for rendering small in size, thin in thickness, light in weight and high in performance are becoming severe also for batteries, similarly to portable electronic appliances.

To meet the above-mentioned requirements. attempts are being made for improving electrodes, electrolytes and other battery parts. As for electrodes, an active material and a collector, and further a binder for adhering an active material to a collector are being investigated. Generally a binder is incorporated in water or an organic liquid to prepare a binder composition, and in turn, the binder composition is mixed with an active material and, if desired, an electrically conductive material to prepare a slurry. A collector is coated with the slurry and the coating is dried to give an electrode. As for the binder composition, various polymers have been proposed as a binder ingredient to be contained in the binder composition.

Recently it is eagerly desired to develop a binder composition suitable for making an electrode of a secondary battery having a high capacity and exhibiting a minimized capacity reduction at repetition of a charge-discharge cycle.

For example, it is described in Japanese Unexamined Patent Publication No. H8-287915 that an electrode made by using as a binder a copolymer of an acrylic acid ester or a methacrylic acid ester, acrylonitrile and a vinyl monomer having an acid ingredient provides a positive electrode and/or a negative electrode of a lithium ion secondary batter having a high capacity and exhibiting improved characteristics at repetition of a charge-discharge cycle.

However, researches of the present inventors revealed that the lithium ion secondary battery made by using the copolymer binder disclosed in the above-mentioned patent publication still does not give a satisfactory characteristics at repetition of a charge-discharge cycle, that is, the initial capacity is on a satisfactory level but the capacity is reduced to a great extent at repetition of a charge-discharge cycle.

DISCLOSURE OF THE INVENTION

In view of the fore going, an object of the present invention is to provide a binder composition suitable for manufacturing a lithium ion secondary battery having a high capacity and exhibiting improved characteristics at repetition of a charge-discharge cycle. The present inventors made electrodes using various polymer binders to examine the influence of the polymer binders upon the characteristics of a lithium ion secondary battery, and found that, when a polymer of an ester of acrylic acid or methacrylic acid with ethylene glycol or polyethylene glycol is used as a binder for making an electrode, a lithium ion secondary battery with the electrode has a high capacity and exhibits totally improved characteristics at repetition of a charge-discharge cycle, including characteristics at repetition of a high-rate charge-discharge cycle and at repetition of a low-temperature charge-discharge cycle. The present invention has been completed on the basis of this finding.

Thus, in a first aspect of the present invention, there is provided a binder composition for an electrode for a lithium-ion secondary battery, comprising a polymer and a liquid dispersion medium; characterized in that said polymer comprises structural units represented by the following general formula (1) and is dispersed in the liquid dispersion medium:

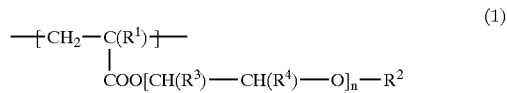

(1)

wherein $R^1$ is hydrogen, a straight chain or branched alkyl group having 1 to 4 carbon atoms, or halogen, $R^2$ is a straight chain, branched or cyclic alkyl group having 1 to 20 carbon atoms, or an aryl group having 6 to 30 carbon atoms, $R^3$ and $R^4$ are hydrogen or a methyl group, provided that $R^3$ and $R^4$ are not simultaneously a methyl group, and n is an integer of 1 to 50.

In a second aspect of the present invention, there is provided a slurry for an electrode for a lithium-ion secondary battery, characterized by comprising the binder composition according to the first aspect of the present invention and an active material.

In a third aspect of the present invention, there is provided an electrode for a lithium-ion secondary battery, characterized as being made by coating a collector with the slurry according to the second aspect of the present invention, and then drying a coating of the slurry.

In a fourth aspect of the present invention, there is provided a lithium-ion secondary battery, characterized in that one of a positive electrode and a negative electrode of the battery is the electrode according to the third aspect of the present invention.

BEST MODE FOR CARRYING OUT THE INVENTION

The binder composition of the present invention, a slurry thereof, an electrode made from the slurry, and a lithium ion secondary battery manufactured by using the electrode will be described by turns.

1. Binder Composition

The binder composition of the present invention is a liquid dispersion of the polymer having structural units represented by formula (1) in a liquid medium. In formula (1), $R^1$ is selected from hydrogen, a straight chain or branched alkyl group having 1 to 4 carbon atoms, and halogen. As specific examples of the alkyl group, there can be mentioned methyl, ethyl, propyl, isopropyl, n-butyl and isobutyl groups. As specific examples of the halogen, there can be mentioned chlorine and bromine. $R^1$ preferably includes hydrogen and a methyl group. $R^2$ is a straight chain, branched or cyclic alkyl group having 1 to 20 carbon atoms, preferably 1 to 15 carbon atoms, or an aryl group having 6 to 30 carbon atoms, preferably 6 to 20 carbon atoms. As specific examples of $R^2$, there can be mentioned methyl, ethyl, butyl, phenyl and nonylphenyl groups. Of these, a methyl group is preferable. $R^3$ and $R^4$ are hydrogen or a methyl group, provided that $R^3$ and $R^4$ are not simultaneously a methyl group. n is an integer of 1 to 50, preferably 2 to 30 and more preferably 5 to 25.

The polymer having structural units represented by formula (1) is obtained by polymerizing an ethylenically unsaturated monocarboxylic acid ester monomer represented by the following general formula (2):

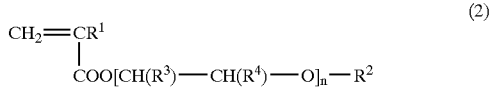

(2)

wherein $R^1$, $R^2$, $R^3$ and $R^4$ are as defined above. As specific examples of this ethylenically unsaturated monocarboxylic acid ester monomer, there can be mentioned methoxypolyethylene glycol methacrylate, ethoxypolyethylene glycol methacrylate, methoxypolyethylene glycol acrylate, ethoxypolyethylene glycol acrylate, methoxydiethylene glycol methacrylate, ethoxydiethylene glycol acrylate, methoxydipropylene glycol methacrylate, methoxydipropylene glycol acrylate, methoxyethyl methacrylate, methoxyethyl acrylate, 2-ethoxyethyl methacrylate, 2-ethoxyethyl acrylate, butoxyethyl methacrylate, butoxyethyl acrylate, phenoxyethyl methacrylate and phenoxyethyl acrylate. These ethylenically unsaturated monocarboxylic acid ester monomers may be used either alone or as a combination of at least two thereof.

The polymer having structural units represented by formula (1) may a homopolymer consisting only of said structural units, but is preferably a copolymer comprising, in addition to the structural units of formula (1), structural units of a non-polar acrylic acid ester or a non-polar methacrylic acid ester (other than the structural units of formula (1)) and structural units of a polar monomer.

By introducing structural units of a non-polar acrylic acid ester or a non-polar methacrylic acid, other than the structural units of formula (1), in a polymer, the resulting polymer exhibits an improved adhesion to a collector and an improved flexibility. Such structural units of a non-polar acrylic acid ester or a non-polar methacrylic acid are represented by the following formula (3):

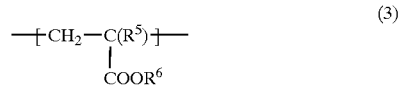

(3)

wherein $R^5$ is hydrogen or a methyl group, and $R^6$ is an alkyl group having 1 to 20 carbon atoms, preferably 1 to 12 carbon atoms.

As specific examples of the acrylic acid ester monomer and methacrylic acid ester monomer to be copolymerized for introduction of structural units of formula (3), there can be mentioned alkyl acrylates such as methyl acrylate, ethyl acrylate, propyl acrylate, isopropyl acrylate, n-butyl acrylate, isobutyl acrylate, n-amyl acrylate, isoamyl acrylate, n-hexyl acrylate, 2-ethylhexyl acrylate and lauryl acrylate; and alkyl methacrylates such as methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate and lauryl methacrylate. These alkyl acrylates and alkyl methacrylates may be used either alone or as a combination of at least two thereof.

By copolymerizing the above-mentioned monomer with a polar monomer, dispersibility of the polymer in a liquid medium, especially in an organic medium, is improved. As specific examples of the polar monomer, there can be mentioned cyano group-containing monoethylenically unsaturated monomers such as acrylonitrile and methacrylonitrile; alkyl acrylate and alkyl methacrylate monomers, which have an alkyl group with 1 to 20 carbon atoms, preferably 1 to 12 carbon atoms, having at least one substituent selected from a hydroxyl group, an amino group and alkylamino groups, such as 2-hydroxyethyl methacrylate, 2-hydroxyethyl acrylate, 2-hydroxypropyl methacrylate, 2-hydroxypropyl acrylate, dimethylaminoethyl methacrylate and diethylaminoethyl methacrylate; and ethylenically unsaturated monocarboxylic acid monomers such as acrylic acid, methacrylic acid and crotonic acid. These polar monomers may be used either alone or as a combination of at least two thereof.

The above-mentioned copolymer generally comprises 0.1 to 100% by weight, preferably 0.5 to 60% by weight and more preferably 0.5 to 50% by weight of the structural units of formula (1), 0 to 99.9% by weight, preferably 10 to 95% by weight and more preferably 30 to 90% by weight of the acrylic acid ester or methacrylic acid ester structural units of formula (3), and 0 to 50% by weight, preferably 0.1 to 30% by weight and more preferably 0.5 to 20% by weight of the structural units derived from a polar monomer.

The content of the above-mentioned copolymer in the binder composition of the present invention is usually in the range of 0.2 to 80% by weight, preferably 0.5 to 70% by weight and more preferably 0.5 to 60% by weight, based on the weight of the binder composition.

To give a polymer having a crosslinked structure, structural units derived from a polyfunctional ethylenically unsaturated monomer can be introduced in addition to the above-mentioned structural units. As specific examples of the monomer giving such structural units, there can be mentioned divinyl compounds such as divinylbenzene; dimethacrylic acid esters such as diethylene glycol dimethacrylate and ethylene glycol dimethacrylate; trimethacrylic acid esters such as trimethylolpropane trimethacrylate; diacrylic acid esters such as polyethylene glycol diacrylate and 1,3-butylene glycol diacrylate; and triacrylic acid esters such as trimethylolpropane triacrylate. These crosslinking monomers may be used either alone or in combination. The amount of the crosslinking monomer is not larger than 20% by weight, usually in the range of 0.1 to 20% by weight, preferably 0.5 to 15% by weight and more preferably 1 to 10% by weight, based on the weight of the total structural units constituting the polymer. The crosslinking may also be conducted after a polymer is produced. When the polymer contains crosslinked structural units, characteristics at repetition of a charge-discharge cycle, especially at repetition of a high-temperature charge-discharge cycle, become more stabilized and resistance to an electrolyte is enhanced.

The liquid medium used for the preparation of a liquid dispersion of the above-mentioned polymer is not particularly limited provided the polymer is well dispersible therein. Usually a liquid medium having a boiling point in the range of 80 to 350° C., preferably 100 to 300° C. at normal pressure is used. As preferable examples of the liquid medium, there can be mentioned the following substances. Numeral within each parenthesis denotes a boiling point (unit: ° C.) at normal pressure as expressed by counting fractions of 0.5 and over as a whole number and disregarding the rest.

Water (100); hydrocarbons such as n-dodecane (216), decahydronaphthalene (189–191) and tetraline (207); alcohols such as 2-ethyl-1-hexanol (184) and 1-nonanol (214); ketones such as phorone (197), acetophenone (202) and isophrone (215); esters such as benzyl acetate (213), isopentyl butyrate (184), $\mu$-butyrolactone (204), methyl lactate (143), ethyl lactate (154) and butyl lactate (185); amines such as o-toluidine (200), m-toluidine (204) and p-toluidine (201); amides such as N-methyl-2-pyrrolidone (202), N,N-dimethylacetamide (194) and N,N-dimethylformamide (153); and sulfoxides and sulfones, such as diemthylsulfoxide (189) and sulforane (287).

The polymer in the binder composition of the present invention is usually in the form of particles and dispersed a liquid dispersion medium. The presence of polymer particles can be easily confirmed by a transmission electron microscope or an optical microscope. The polymer particles have a volume average particle diameter in the range of 0.001 $\mu$m to 1 mm, preferably 0.01 $\mu$m to 500 $\mu$m. The volume average particle diameter can be measured by a Coulter counter or a microtrac.

The method for preparing the binder composition of the present invention is not particularly limited, but, in view of enhanced production efficiency, preferable is a latex comprising polymer particles dispersed in an aqueous medium, and a liquid dispersion prepared by substituting water in an aqueous latex with the above-mentioned organic liquid dispersion medium. The manner in which water is substituted with an organic liquid dispersion medium, includes those in which a latex having incorporated therein an organic liquid dispersion medium is subjected to a distillation method, a fractional filtration method, or a method of phase reversal of dispersion medium, to remove water.

The procedure for preparing latex of the polymer is not particularly limited, and includes an emulsion polymerization procedure and a suspension polymerization procedure. For example, a latex, i.e., an aqueous dispersion of polymer in water, can be prepared by a method described in Jikken Kagaku Koza, vol. 28, edited by Nihon Kagakukai [Japanese Chemical Society] and published by Maruzen K.K.), namely, a method wherein a closed vessel provided with a stirrer and a heating means is charged with water, an initiator, monomers, a dispersing agent, an emulsifying agent, a crosslinking agent and other additives to prepare a monomer charge having a predetermined composition; the monomer charge is stirred whereby the monomers are emulsified or suspended in water; and the temperature is elevated while the monomer charge is stirred, to initiate a polymerization. Alternatively, the binder composition of the present invention can be directly produced by a dispersion polymerization method using an organic liquid dispersion medium.

The kinds and amounts of emulsifier, dispersing agent and polymerization initiator can be chosen from those which are conventionally employed in an emulsion polymerization method, a suspension polymerization method and a dispersion polymerization method. A seed polymerization using a seed particle can also be conducted.

The polymerization temperature and the polymerization time can be appropriately chosen depending upon the particular procedure for polymerization and the kind of polymerization initiator, but, usually the polymerization temperature is at least about 30° C. and the polymerization time is in the range of about 0.5 to 30 hours. A polymerization aid such as an amine can be used.

To a latex produced by the above-mentioned polymerization procedures, an aqueous basic solution can be added to adjust the pH value so as to fall in the range of 5 to 10, preferably 5 to 9. The basic aqueous solution is an aqueous solution of a base, for example, a hydroxide of an alkali metal such as Li, Na, K, Rb or Cs; ammonia; or an organic amine compound such as ethanolamine or diethylamine. Among others, the pH adjustment using an alkali metal hydroxide is preferable because a bonding force (peel strength) between a collector and an active material can be enhanced.

The above-mentioned polymer may be in the form of composite particles composed of two or more kinds of polymers. The composite particles can be produced, for example, by a two-stage polymerization process wherein one or more kinds of monomers are polymerized by an ordinary procedure and subsequently other kind of monomer or monomers are added and polymerized by an ordinary procedure. The composite polymer particles prepared by the two-stage polymerization process give a battery having excellent battery properties.

The composite particles usually have an odd-shaped structure which includes, for example, a core-shell type structure, an islands-in-sea type structure, a side-by-side type structure, a tumbler type structure, an octopus ocellus type structure and a raspberry type structure, which are called in the field of latexes and described in "Setchaku (Adhesion)" vol. 34, No. 1, p13–23, especially illustrated in FIG. 6 on page 17.

It is important that the polymer in the binder composition of the present invention is insoluble or only slightly soluble in an electrolyte solution for the polymer exhibits a function of binder. Thus, the polymer in the binder composition preferably has a gel content, as calculated as insoluble matter in an electrolyte solution, of 50% to 100%, more preferably 60% to 100%, and especially preferably 70% to 100%. The gel content (hereinafter referred to merely as "gel content") used herein means that as calculated as a ratio in % of insoluble matter to an electrolyte solution, which is a one mole/liter solution of $LiPF_6$ in a mixed solvent comprised of ethylene carbonate/diethyl carbonate at a ratio of 50/50 by volume at 20° C. (the details for measuring method will be hereinafter described).

It is also important that the polymer is dispersed in a liquid medium, preferably dispersed in the form of particles in liquid medium for providing en electrode of the desired property. Thus, the polymer preferably has a gel content, as a ratio of insoluble matter to a liquid medium used for preparation of the binder composition, of 50% to 100%, more preferably 60% to 100%, and especially preferably 70% to 100%, in view of the characteristics at repetition of charge-discharge cycles, the initial service capacity, and the storage stability. The gel content as used herein means that as calculated as a ratio in % of insoluble polymer particles to a liquid medium contained in the binder composition.

Additives such as a viscosity modifier and a fluidizing agent can be added in the binder composition of the present invention to improve coating fluid properties of a slurry containing the binder composition, for coating a collector with the slurry. As specific examples of the additives, there can be mentioned cellulosic materials such as carboxymethyl cellulose, methyl cellulose and hydroxypropyl cellulose, and ammonium salts and alkali metal salts of these cellulosic materials: polyacrylic acid salts and polymethacrylic acid salts such as sodium polyacrylate and sodium methacrylate; polyvinyl alcohol, polyethylene oxide, polyvinyl pyrrolidone, a copolymer of acrylic acid or methacrylic acid or salts thereof with vinyl alcohol, a copolymer of maleic anhydride, maleic acid or fumaric acid with vinyl alcohol, modified polyvinyl alcohol, modifed polyacrylic acid, modified polymethacrylic acid, polyethylene glycol, an ethylene-vinyl alcohol copolymer, and a vinyl acetate polymer. The amount of these additives can be appropriately chosen according to the need.

The binder composition of the present invention may contain polymers (hereinafter referred to as "other polymers") other than the above-mentioned polymers, which include those which are known as a binder for an electrode of battery. The amount of such other polymers is preferably not larger than 5 part by weight based on 1 part of the polymer particles.

2. Slurry for Electrode for Battery

The slurry for an electrode for lithium ion secondary battery, of the present invention is characterized as comprising the above-mentioned binder composition and an active material.

Active Material

The active material is not particularly limited provided that it is used for ordinary lithium ion secondary batteries.

As specific examples of the active material used for a negative electrode, there can be mentioned carbonaceous materials such as amorphous carbon, hard carbon, graphite, natural graphite, MCMB, and pitch carbon fiber; electrically conductive polymers such as polyacene; and composite metal oxides and other metal oxides.

As specific examples of the active material used for a positive electrode, there can be mentioned transition metal oxides such as $Cu_2V_2O_3$, amorphous $V_2O$—$P_2O_5$, $MoO_3$, $V_2O_5$ and $V_6O_{13}$; and lithium-containing composite metal oxides such as $LiCoO_2$, $LiNiO_2$, $LiMnO_2$ and $LiMn_2O_4$. The active material for a positive electrode further includes organic compounds including electrically conductive polymers such as polyacetylene and poly-p-phenylene.

The amount of an active material in the slurry for a battery electrode of the present invention is not particularly limited and is usually 1 to 1,000 times, preferably 2 to 500 times, more preferably 3 to 500 times and especially preferably 5 to 300 times, of the weight of the polymer (i.e., the solid content in the binder composition). When the amount of an active material is too small, an active material layer formed on a collector has a reduced activity and the electrode is liable to have poor performances. In contrast, when the amount of an active material is too large, the adhesion of the active material to a collector becomes poor and the active material tends to be fallen from the collector. A liquid medium such as water or an organic dispersion medium can be added to the slurry so that the concentration of an active material in the slurry be suitable for coating a collector with the slurry.

Additives

According to the need, additives such as a viscosity modifier and a fluidizing agent, which are hereinbefore mentioned as for the binder composition of the present invention, can be incorporated in the slurry. Further, electrically conductive materials including carbon such as graphite and active carbon, and a metal powder, can be incorporated in the slurry.

3. Electrode for Lithium Ion Secondary Battery

The electrode of the present invention for a lithium ion secondary battery is characterized as being made by using the above-mentioned slurry. That is, the electrode is made by coating a collector such as a metal foil with the above-mentioned slurry, and drying a coating of the slurry to fix an active material on the collector. The electrode may be either a positive electrode or a negative electrode.

The collector used is not particularly limited provided that it is composed of an electrically conductive material. The collector is usually composed of metal such as iron, copper, aluminum, nickel or stainless steel. The shape of the collector is also not particularly limited, and the collector is usually used in a sheet form having a thickness of about 0.001 mm to 0.5 mm.

The procedure of coating the collector with the slurry is not particularly limited. The collector can be coated with the slurry by a conventional coating procedure such as doctor-blade coating, dip coating, reverse-roll coating, direct-roll coating, gravure coating, extrusion coating and brush coating. The amount of the slurry applied is not particularly limited, and is usually such that the thickness of the active material layer, formed by removing water or an organic dispersion medium by drying a coating of the slurry, has a thickness of 0.005 mm to 5 mm, preferably 0.01 mm to 2 mm. The procedure for drying an as-formed coating is not particularly limited, and includes, for example, warm-air drying, hot-air drying, low-humid-air drying, vacuum drying, infrared drying, far-infrared drying and electron radiation drying. The drying conditions should be chosen so that water or an organic dispersion medium used is removed as soon as possible but at a rate such that occurrence of stress crack in the active material layer due to stress concentration, and separation of the active material layer from the collector can be avoided.

The coated collector can be pressed, if desired, to enhance the density of the active material layer. The pressing can be carried out, for example, by a mold pressing and a roll pressing.

4. Lithium Ion Secondary Battery

The lithium ion secondary battery of the present invention comprises the above-mentioned electrode and an electrolyte solution, and, according to the need, a separator and other elements. The lithium ion secondary battery is fabricated by an ordinary procedure. For example, a positive electrode and a negative electrode are superposed with a separator interposed between the two electrodes, and the thus-formed assembly is wound or folded and then inserted into a vessel. An electrolyte solution is introduced into the vessel, and the vessel is sealed. The shape of the secondary battery is not particularly limited, and is, for example, coin-shape, button-shape, sheet-shape, cylindrical shape, rectangular shape and flat shape.

The electrolyte solution is in any form of gel or liquid and is selected from those which are conventionally used for a lithium ion secondary battery. A suitable electrolyte solution can be chosen depending upon the particular active material used for a positive electrode or a negative electrode so as to obtain the desired battery performances.

The electrolyte of the secondary battery includes known lithium salts. As specific examples of the electrolyte, there can be mentioned $LiClO_4$, $LiBF_6$, $LiPF_6$, $LiCF_3SO_3$ and $LiCF_3CO_2$. A polymeric electrolyte can also be used.

The liquid medium used for dissolving the electrolyte is not particularly limited and includes conventional liquid mediums. As specific examples of the liquid medium, there can be mentioned carbonates such as propylene carbonate, ethylene carbonate, butylene carbonate, dimethyl carbonate and diethyl carbonate; lactones such as r-butyrolactone; ethers such as trimethoxymethane, 1,2-dimethoxyethane, diethyl ether, 2-ethoxyethane, tetrahydrofuran and 2-methyltetrahydrofuran; sulfoxides such as dimethylsulfoxide; oxolanes such as 1.3-dioxolane and 4-methyl-1,3-dioxolane; nitrogen-containing compounds such as acetonitrile and nitromethane; oraganic acid esters such as methyl formate, methyl acetate, ethyl acetate, butyl acetate, methyl propionate and ethyl propionate; inorganic acid esters such as phosphoric acid triesters and carbonic acid diesters including dipropyl carbonate; diglymes; triglymes; sulfolanes; oxazolidinones such as 3-methyl-2-oxazolidinone; and sultones such as 1,3-propanesultone, 1,4-butanesultone and naphthasultone. These liquid mediumsmay be used either alone or as a mixed liquid comprised of at least two thereof.

The invention will now be described more specifically by the following working examples that by no means limit the scope of the invention.

In the working examples, parts and % are by weight unless otherwise specified.

Gel content of polymers and properties of batteries in Examples and Comparative Examples were evaluated by the following methods.

Gel Content of Polymer

The gel content of polymer is defined as a ratio of polymer insoluble in an electrolyte to the total polymer. A glass plate is coated with a latex or a liquid dispersion of polymer particles to form a filmy coating having a thickness of about 0.1 mm. The filmy coating is air-dried at 120° C. for 24 hours and further vacuum-dried at 120° C. for 2 hours. The dry film is weighed (the weight is referred to as "D1"). Then the dry film is placed in a basket made of SUS steel wire mesh with mesh size of 200, and the basket is dipped in an electrolyte solution containing $LiPF_6$ in an amount of 1 mol per liter of a mixed liquid comprised of ethylene carbonate and diethyl carbonate (ratio of 50/50 by volume at 20° C.) and heat-treated at 60° C. for 48 hours. The content in the basket is filtered by the wire mesh with 200 mesh size. The insoluble matter remaining on the wire mesh is vacuum-dried at 120° C. for 24 hours and then weighed (the weight is referred to as "D2") The gel content of polymer is calculated according to the equation:

Gel content (%)=(D2/D1)×100

Battery Performance (1) Characteristics of Battery at Repetition of Charge-Discharge Cycle at Room Temperature A coin-shaped secondary battery specimen is fabricated by the method described below. A charge-discharge cycle test is conducted by measuring service capacity of the battery, while a cycle of charging the battery to a voltage of 4.2 V and then discharging it to a voltage of 3 V is repeated at a temperature of 25° C. and at a constant current rate of 0.1 C. The measurement of service capacity is carried out when the fifth cycle, the tenth cycle and the 50th cycle are completed. The capacity is expressed in mAh/g of active material in the positive electrode.

(2) Characteristics of Battery at Repetition of High-Rate Charge-Discharge Cycle The charge-discharge cycle test is carried out in the same manner as in the above-mentioned test in (1) except that the charge-discharge current rate is changed to 1 C. The service capacity is measured at completions of the fifth cycle and the tenth cycle.

(3) Characteristics of Battery at Repetition of Charge-Discharge Cycle at Low Temperature The charge-discharge cycle test is carried out in the same manner as in the above-mentioned test in (1) except that the charge-discharge cycle is conducted in an atmosphere maintained at a temperature of −10° C. The service capacity is measured at completion of the fifth cycle and the tenth cycle.

Fabrication of Coin-Shaped Battery

Coin-shaped secondary battery is fabricated as follows. An aluminum foil collector having a thickness of 20 μm is uniformly coated with an active material-containing slurry for positive electrode by a doctor blade. A copper foil collector having a thickness of 18 μm is uniformly coated with an active material-containing slurry for negative electrode by a doctor blade. Each as-formed coating is dried at 120° C. for 15 minutes in a drier, and further vacuum-dried under 5 mmHg at 120° C. for 2 hours. The dried coated aluminum foil is pressed by a twin roll press so that the density of an active material is 3.2 $g/cm^3$ to prepare a positive electrode having an active material layer. The dried coated copper foil is pressed by a twin roll press so that the density of an active material is 1.3 $g/cm^3$ to prepare a negative electrode having an active material layer.

Each of the aluminum positive electrode and the copper negative electrode is cut into a circular shape having a diameter of 15 mm. A battery is fabricated by using the circular aluminum positive electrode and the circular copper negative electrode or a lithium metal negative electrode, and a separator. The separator is sandwiched between the aluminum positive electrode and the copper negative electrode or the lithium metal negative electrode so that the active material layers of the two electrodes confront to each other. The separator is comprised of a circular porous polypropylene film having a diameter of 18 mm and a thickness of 25 μm. An assembly composed of the positive electrode, the separator, and the negative electrode is placed in a coin-shaped outer casing having a diameter of 20 mm and a height of 1.8 mm and made of a stainless steel sheet having a thickness 0.25 mm, so that the aluminum foil positive electrode is kept in contact with the casing bottom. An expanded metal part is placed on the negative electrode. A polypropylene packing is packed within the casing. An electrolyte solution is injected into the casing so that no air remains within the casing. The thus-fabricated assembly is covered with a stainless steel cap having a thickness of 0.2 mm via the polypropylene packing. The assembly-packed casing is sealed whereby a coin-shaped battery having a diameter of 20 mm and a thickness of about 2 mm is obtained. The electrolyte solution is a solution of $LiPF_6$ with a concentration of 1 mol/liter of a mixed liquid composed of ethylene carbonate/diethyl carbonate at a mixing ratio of 50/50 (volume ratio at 20° C.).

EXAMPLE 1

Preparation of Polymer Particles

A reaction vessel equipped with a stirrer was charged with 300 parts of 2-ethylhexyl acrylate, 200 parts of methoxy-polyethylene glycol methacrylate, 15 parts of triethylene glycol dimethacrylate as a crosslinking agent, 5 parts of sodium dodecylbenzenesulfonate as a dispersant, 1,000 parts of ion exchanged water and 5 parts of potassium persulfate as a polymerization initiator. The content was thoroughly stirred and maintained at 80° C. to carry out a polymerization. When the consumption of the monomers reached 99.0%, the polymerization mixture was cooled to stop the polymerization. Thus, a latex of polymer particles "a" having a pH value of 8 was obtained. The polymer particles had a gel content of 94%.

Preparation of Binder Composition

To the latex of polymer particles "a", a sodium salt of carboxymethyl cellulose was added in an amount such that the ratio of the sodium salt of carboxymethyl cellulose to the solid matter of polymer particles "a" was 1/1 by weight, to prepare a binder composition A.

Manufacture of Positive Electrode

To 90 parts of lithium cobaltate, 5 parts of acetylene black and 5 parts (as solid content) of the binder composition A were added, and the mixture was thoroughly agitated to prepare a slurry for a positive electrode. An aluminum foil was coated with the slurry, and the coated foil was dried and then roll-pressed to obtain a positive electrode A having a thickness of 125 $\mu$m.

Evaluation of Battery Performance

A battery was fabricated from the positive electrode A and a lithium metal negative electrode. Characteristics at repetition of a charge-discharge cycle at a room temperature were examined. The capacities as measured at completions of the fifth cycle, the tenth cycle and the 50th cycle were 125 mAh/g, 121 mAh/g and 118 mAh/g, respectively. Thus the capacity was reduced only to a slight extent and the characteristics at repetition of a charge-discharge cycle at a room temperature were excellent.

Characteristics at repetition of a high-rate charge-discharge cycle were examined. The capacities as measured at completions of the fifth cycle and the tenth cycle were 105 mAh/g and 95 mAh/g, respectively. The capacity was reduced only to a slight extent.

Characteristics at repetition of a charge-discharge cycle at a low-temperature were examined at −10° C. The capacities as measured at completions of the fifth cycle and the tenth cycle were 105 mAh/g and 97 mAh/g, respectively. Thus the capacity was reduced only to a slight extent.

EXAMPLE 2

Preparation of Polymer Particles

A reaction vessel equipped with a stirrer was charged with 270 parts of 2-ethylhexyl acrylate, 200 parts of methoxy-polyethylene glycol methacrylate, 6 parts of acrylonitrile, 6 parts of triethylene glycol dimethacrylate as a crosslinking agent, 15 parts of sodium dodecylbenzenesulfonate as a dispersant, 700 parts of ion exchanged water and 15 parts of potassium persulfate as a polymerization initiator. The content was thoroughly stirred and maintained at 80° C. to carry out a polymerization. When the consumption of the monomers reached 99.8%, the polymerization mixture was cooled to stop the polymerization. Thus, a latex of polymer particles "b" having a pH value of 8 was obtained. The polymer particles had a gel content of 91%.

Preparation of Binder Composition, Manufacture of Negative Electrode, and Evaluation Battery Performance To the latex of polymer particles "b", a sodium salt of carboxymethyl cellulose was added in an amount such that the ratio of the sodium salt of carboxymethyl cellulose to the solid matter of polymer particles "b" was 1/1 by weight, to prepare a binder composition B.

To 96 parts of natural graphite, 4 parts (as solid content) of the binder composition B was added to prepare a slurry for a negative electrode. A copper foil was coated with the slurry, and the coated foil was dried and then roll-pressed to obtain a negative electrode B having a thickness of 80 $\mu$m.

A battery was fabricated from the negative electrode B and the same positive electrode A as that made in Example 1, and characteristics at repetition of a charge-discharge cycle were examined. The results were as follows.

Characteristics at repetition of a charge-discharge cycle at room temperature: capacities at completions of the fifth cycle, the tenth cycle and the 50th cycle were 128 mAh/g, 126 mAh/g and 118 mAh/g, respectively. Thus the capacity was reduced only to a slight extent.

Characteristics at repetition of a high-rate charge-discharge cycle: capacities at completions of the fifth cycle and the tenth cycle were 110 mAh/g and 102 mAh/g, respectively.

Characteristics at repetition of a charge-discharge cycle at a low-temperature: capacities at completions of the fifth cycle and the tenth cycle were 101 mAh/g and 96 mAh/g, respectively.

EXAMPLE 3

Preparation of Binder Composition

To 100 parts of the latex of polymer particles "b" prepared in Example 2, 300 parts of N-methyl-2-pyrrolidone as an organic solvent was added. The mixture was placed under a reduced pressure by a vacuum pump while being stirred, and heated to 80° C. to remove water. Thus a dispersion of polymer particles "b" having a solid content of 8% in N-methyl-2-pyrrolidone was obtained.

To the polymer particle dispersion "b", an ethylene-vinyl alcohol copolymer (ethylene content: 40%) was added in an amount such that the ratio of the ethylene-vinyl alcohol copolymer to the solid matter of polymer particles "b" was 1/1 by weight, to prepare a binder composition C.

Evaluation of Battery Performance

A battery was fabricated by the same procedures as described in Example 1 wherein the binder composition C was used instead of the binder composition A, and characteristics at repetition of a charge-discharge cycle were examined. The results were as follows.

Characteristics at repetition of a charge-discharge cycle at room temperature: capacities at completions of the fifth cycle, the tenth cycle and the 50th cycle were 132 mAh/g, 130 mAh/g and 128 mAh/g, respectively. Thus the capacity was reduced only to a slight extent.

Characteristics at repetition of a high-rate charge-discharge cycle: capacities at completions of the fifth cycle and the tenth cycle were 127 mAh/g and 123 mAh/g, respectively.

Characteristics at repetition of a charge-discharge cycle at a low-temperature: capacities at completions of the fifth cycle and the tenth cycle were 120 mAh/g and 116 mAh/g, respectively.

COMPARATIVE EXAMPLE 1

Preparation of Polymer Particles

A reaction vessel equipped with a stirrer was charged with 160 parts of acrylonitrile, 70 parts of 2-ethylhexyl acrylate, 700 parts of styrene, 0.5 part of divinylbenzene as a crosslinking agent, 6 parts of sodium dodecylbenzenesulfonate as a dispersant, 700 parts of ion exchanged water and 6 parts of potassium persulfate as a polymerization initiator. The content was thoroughly stirred and maintained at 80° C. to carry out a polymerization. When the consumption of the monomers reached 99.1%, the polymerization mixture was cooled to stop the polymerization. Thus, a latex of polymer particles "d" was obtained. The polymer particles had a gel content of 85%.

Preparation of Binder Composition, and Evaluation Battery Performance

To the latex of polymer particles "d", a sodium salt of carboxymethyl cellulose was added in an amount such that the ratio of the sodium salt of carboxymethyl cellulose to the solid matter of polymer particles "d" was 1/1 by weight, to prepare a binder composition D.

A battery was fabricated by the same procedures as described in Example 1 wherein the binder composition D was used instead of the binder composition A, and characteristics at repetition of a charge-discharge cycle were examined. The results were as follows.

Characteristics at repetition of a charge-discharge cycle at room temperature: capacities at completions of the fifth cycle, the tenth cycle and the 50th cycle were 118 mAh/g, 66 mAh/g and 12 mAh/g, respectively. Thus the capacity was reduced to a great extent.

COMPARATIVE EXAMPLE 2

Preparation of Polymer Particles

A reaction vessel equipped with a stirrer was charged with 300 parts of acrylonitrile, 250 parts of 2-ethylhexyl acrylate, 50 parts of styrene, 6 parts of sodium dodecylbenzenesulfonate as a dispersant, 700 parts of ion exchanged water and 6 parts of potassium persulfate as a polymerization initiator. The content was thoroughly stirred and maintained at 80° C. to carry out a polymerization. When the consumption of the monomers reached 98.8%, the polymerization mixture was cooled to stop the polymerization. Thus, a latex of polymer particles "e" was obtained. The polymer particles had a gel content of 13%.

Preparation of Binder Composition, and Evaluation Battery Performance

To the latex of polymer particles "e", a sodium salt of carboxymethyl cellulose was added in an amount such that the ratio of the sodium salt of carboxymethyl cellulose to the solid matter of polymer particles "e" was 1/1 by weight, to prepare a binder composition E.

A battery was fabricated by the same procedures as described in Example 1 wherein the binder composition E was used instead of the binder composition A, and characteristics at repetition of a charge-discharge cycle were examined. The results were as follows.

Characteristics at repetition of a charge-discharge cycle at room temperature: capacities at completions of the fifth cycle and the tenth cycle were 38 mAh/g and 16 mAh/g, respectively.

INDUSTRIAL APPLICABILITY

A lithium ion secondary battery having an electrode made by using the binder composition of the present invention has a high capacity and exhibits totally improved characteristics at repetition of a charge-discharge cycle, including characteristics at repetition of a low-temperature charge-discharge cycle and at repetition of a high-rate charge-discharge cycle.

What is claimed is:

1. A binder composition for an electrode for a lithium-ion secondary battery, comprising a polymer and a liquid dispersion medium; characterized in that said polymer comprises structural units represented by the following general formula (1) and is dispersed in the liquid dispersion medium:

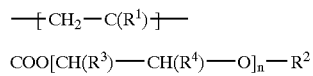

$$\text{—}(\text{CH}_2\text{—}\text{C}(R^1))\text{—} \quad (1)$$
$$\text{COO}[\text{CH}(R^3)\text{—}\text{CH}(R^4)\text{—}\text{O}]_n\text{—}R^2$$

wherein $R^1$ is hydrogen, a straight chain or branched alkyl group having 1 to 4 carbon atoms, or halogen, $R^2$ is a straight chain, branched or cyclic alkyl group having 1 to 20 carbon atoms, or an aryl group having 6 to 30 carbon atoms, $R^3$ and $R^4$ are hydrogen or a methyl group, provided that $R^3$ and $R^4$ are not simultaneously a methyl group, and n is an integer of 1 to 50; and said polymer has a gel content of 50% to 100%, as calculated as a ratio in % of insoluble matter to an electrolyte solution, which is a one mole/liter solution of $\text{LiPF}_6$ in a mixed solvent comprised of ethylene carbonate/diethyl carbonate at a ratio of 50/50 by volume as measured at 20° C.

2. The binder composition according to claim 1, wherein said polymer comprises 0.1 to 100% by weight of the structural units of formula (1), 0 to 99.9% by weight of acrylic acid ester or methacrylic acid ester structural units represented by the following formula (3), 0 to 50% by weight of structural units derived from a polar monomer and 0 to 20% by weight of units derived from a crosslinking monomer:

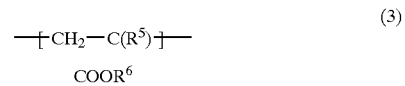

$$\text{—}(\text{CH}_2\text{—}\text{C}(R^5))\text{—} \quad (3)$$
$$\text{COOR}^6$$

wherein $R^5$ is hydrogen or a methyl group, and $R^6$ is an alkyl group having 1 to 20 carbon atoms.

3. The binder composition according to claim 2, wherein the polar monomer is at least one monomer selected from the group consisting of cyano group-containing monoethylenically unsaturated monomers, alkyl acrylate and alkyl methacrylate monomers, the alkyl group having 1 to 20 carbon atoms and having at least one substituent selected from the group consisting of a hydroxyl group, an amino group and alkylamino groups, and ethylenically unsaturated monocarboxylic acids.

4. The binder composition according to claim 1, wherein the content of the polymer is in the range of 0.2 to 80% by weight based on the weight of the binder composition.

5. The binder composition according to claim 1, wherein the liquid dispersion medium is a dispersion medium having a boiling point of 80 to 350° C. at normal pressure.

6. The binder composition according to claim 1, wherein the polymer has a gel content of 50 to 100% in the liquid dispersion medium.

7. A slurry for an electrode for a lithium-ion secondary battery, characterized by comprising a binder composition as claimed in claim 1, and an active material.

8. The slurry for an electrode according to claim 7, wherein the amount of the active material is in the range of 1 to 1,000 times by weight of the amount of the solid content in the binder composition.

9. An electrode for a lithium-ion secondary battery, characterized as being made by coating a collector with a slurry as claimed in claim 8, and then drying a coating of the slurry.

10. The electrode for a lithium-ion secondary battery according to claim 9, which has an active material layer having a thickness of 0.005 to 5 mm.

11. A lithium-ion secondary battery, characterized in that one of a positive and a negative electrode of the battery is an electrode as claimed in claim 9.

* * * * *